Jan. 5, 1965  R. N. MILLER  3,164,390
FLUID SEAL
Filed Nov. 2, 1959
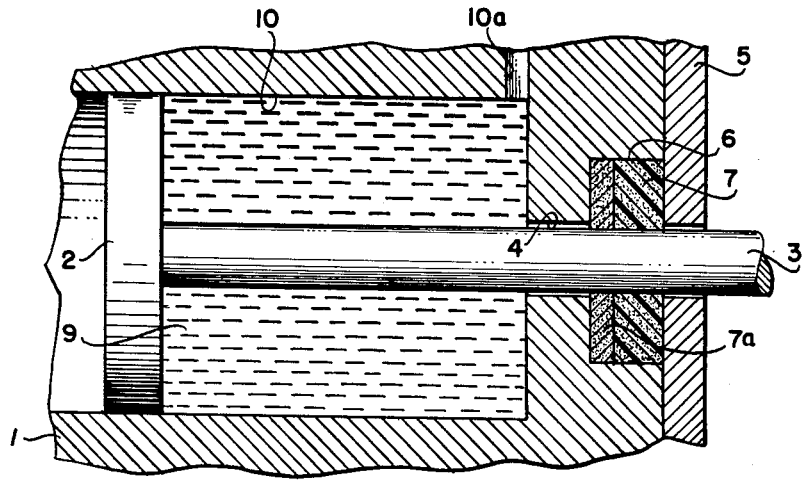
*Fig. 1*
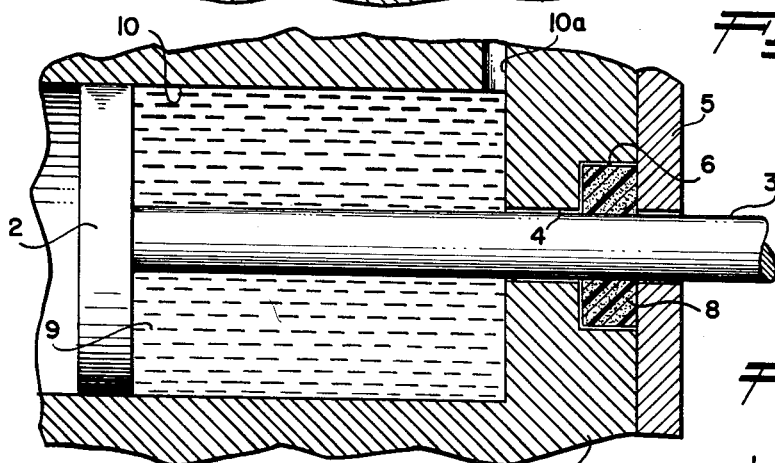
*Fig. 2*
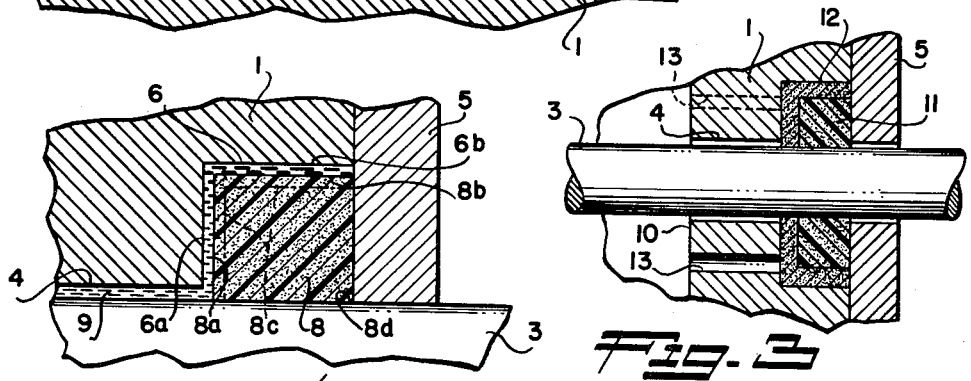
*Fig. 3*
*Fig. 4*
INVENTOR.
ROBERT N. MILLER
BY
George C. Sullivan
Agent 3,164,390
FLUID SEAL
Robert N. Miller, Atlanta, Ga., assignor to Lockheed Aircraft Corporation, Burbank, Calif.
Filed Nov. 2, 1959, Ser. No. 850,189
2 Claims. (Cl. 277—235)

This invention pertains to fluid seals, and more particularly a fluid seal for high-temperature and high-pressure applications wherein the seal is automatically activated or actuated by the fluid pressure.

High pressure fluid systems are most desirable when large fluid forces are needed, and all the more so when weight of the fluid system such as in aircraft and flight operations is concerned. Also, high temperatures are being encountered in high speed flight vehicles due to the aerodynamic heating, as well as elevated temperatures being caused by engine or powerplant heat. Such elevated or high temperatures due to engine heat are also encountered in various other stationary applications.

One of the major problems in the development of high performance fluid systems is that of preventing leakage from dynamic as well as static seals, and especially hydraulic actuator rod seals. As the operating temperature of the system increases and hence the hydraulic fluid temperature, the viscosity of the hydraulic fluid greatly decreases and since the leakage rate is inversely proportional to the fluid viscosity, the leakage problem is aggravated by this factor alone as well as further aggravated by the high pressures.

Heretofore, elastomeric type seals, such as O-rings, have been used primarily. However, such O-ring seals tend to take a compression set at higher temperatures and the resiliency of the O-ring is lost, whereby the result in loss of such resiliency or "squeeze" permits leakage to occur. Since the effective life of a seal depends upon both its resiliency and its wear resistance, the result with conventional O-rings having a single elastomer to provide both resiliency and wear resistance is a compromise structure that does a fair job at ordinary temperatures with limited service at elevated temperatures.

Accordingly, it is an object of this invention to provide a long life, low leakage seal for fluid systems.

Another object of this invention is to provide a fluid seal combining the qualities of high resiliency and high wear resistance at elevated temperatures and pressures.

A further object of this invention is to provide a fluid system seal that is self-energized by pressure from the system.

A still further object of this invention is to provide a fluid system seal operable under both static and dynamic conditions.

It is another object of this invention to provide a fluid system seal whereby sealant may be automatically supplied at the sealing surface to replace any sealant worn away from the sealing surface.

It is yet another object of this invention to provide a fluid seal of simple construction with few parts without requiring complexity of backup rings or other devices.

Further objects and advantages of this invention will become apparent from the following description taken in connection with the accompanying drawings in which:

FIGURE 1 is a partial cross-sectional view of a hydraulic cylinder incorporating a rod seal of one embodiment of this invention;

FIGURE 2 is a view similar to FIGURE 1 showing a further embodiment of this invention;

FIGURE 3 is an enlarged view of a still further embodiment of this invention; and FIGURE 4 is an enlarged view showing details of the seal of FIGURE 2.

Generally stated, the invention comprises a porous metal matrix filled with a high viscosity sealing material. The hydraulic pressure is vented or conducted to surfaces of the seal other than the sealing surface whereby the hydraulic pressure reacts to force the high viscosity sealing material through the porous matrix openings into a sealing engagement at the sealing surface. While a specific application to hydraulic systems is shown, it is to be understood the invention is applicable to use in pneumatic systems as well as hydraulic systems, the only requirement in the adaptability from one system to the other being the possible change in the sealing material of a higher or lower viscosity as the case may be. Usually, a lower viscosity sealing material will be required for a pneumatic system as compared to the viscosity for a hydraulic system operating in the same temperature and pressure regimes.

More particularly, in FIGURE 1 is shown a hydraulic cylinder 1 having a piston 2 therein. A rod or shaft 3 extends from one side of the piston 2 through an opening 4 and an end-plate or end-cover 5 at one end of cylinder 1. Opening 4 is countersunk on the end of cylinder 1 adjacent cover plate 5 to provide an annular groove 6 when end-plate 5 is secured to the end of cylinder 1 by any appropriate means. Located within the annular groove 6 is an annular porous metal matrix 7 that is filled with a high viscosity sealant or sealing material, and a second annular porous ring 7a.

There is provided a substantial radial clearance between the wall of opening 4 and the outer surface of rod 3 such that when the hydraulic medium 9 in variable volume chamber 10 is pressurized to the level of the hydraulic system, through port 10a, the pressurized hydraulic medium 9 is transmitted through the gap between the wall of opening 4 and outer surface of rod 3. The pressurized hydraulic medium 9 can flow through the porous openings of annular ring 7a and react against the high viscosity sealant located within the porous openings of annular ring 7 causing the sealing material to be forced or pushed down into sealing engagement with the surface of rod 3. Thus, the seal is automatically activated or actuated by the pressure of the hydraulic medium, and after the first activation thereof, the seal operates both as a static and dynamic hydraulic seal around the surface of rod 3.

In FIGURES 2 and 4 is shown a modification of the seal shown in FIGURE 1 in that the annular porous ring 7a of FIGURE 1 is dispensed with and the pressurized hydraulic medium 9 can pass through a gap between confronting surfaces 6a and 8a of the annular groove in cylinder 1 and annular porous metal matrix 8 respectively. A similar gap is provided between confronting surfaces 6b and 8b similar to that between 6a and 8a so that the pressurized hydraulic medium 9 is in contact with one vertical sidewall and the outer circumferential surface of annular matrix 8. In this embodiment an incomplete impregnation of the porous metal matrix 8 with the high viscosity sealing material may be accomplished by filling the porous openings of matrix 8 to the levels indicated by phantom lines 8c in FIGURE 4. By this arrangement the hydraulic medium can enter into the porous openings of matrix 8 from the outer surfaces 8a and 8b into contact with the sealing material along lines 8c. Upon continued usage or wearing away of the high viscosity sealing material by the movement of rod 3 relative to matrix 8, the pressure of the hydraulic medium 9 will continually press or force the sealing material through the porous openings of matrix 8 into contact with the surface of rod 3 and toward the corner 8d of matrix 8.

FIGURE 3 presents a further embodiment of the invention wherein the porous matrix 11 is located within a porous cup 12 which provides for getting the pressurized hydraulic medium to the side and outer circumferential surface of matrix 11. A further embodiment included in this arrangement is a plurality of openings 13 extending through the end of cylinder 1 whereby the hydraulic medium can pass from variable volume chamber 10 to the porous cup 12 in addition to passing through the gap between the wall of opening 4 and the surface of rod 3. It is to be understood that the utilization of passages 13 may be incorporated in the embodiments shown in FIGURES 1, 2 and 4.

As for the high viscosity sealing material, any appropriate material may be utilized that has the viscosity properties and the temperature range for which the seal will be utilized. Typical examples of such materials include Teflon (polytetrafluoroethylene) which has good flow properties up to 500° F. and has an extremely low coefficient of friction; silicone putties; silicone elastomers; and Viton A (copolymer of perfluoropropene and vinylidene fluoride) which is a fluorinated hydrocarbon having a substantial heat resistance for an elastomer because of the strength of the fluorine to carbon bond. Usage of the Viton A at elevated temperatures does not brittleize it, but instead softens and remolds it under heat and pressure which makes it a satisfactory impregnating material under certain conditions. In the temperature ranges from 500° to 3500° F. suitable glasses having the desired viscosity in the temperature range the seal is to operate in may be used as the sealant material. For example, ordinary lime glass softens at about 1200° F., borosilicate or Pyrex type glass softens at about 1600° F., fused quartz softens at 2700° F., and special glasses have been recently developed which soften at as low as 500° F. On the high side of the temperature factor, the use of porous tungsten impregnated with a fused quartz glass can operate satisfactorily at temperatures as high as 3500° F.

As can be seen, the invention provides a self-energized type fluid seal of high resiliency and wear resistance that is energized by the pressurized fluid medium of the fluid system.

While particular embodiments of the invention have been illustrated and described, it will be obvious to those skilled in the art that various changes and modifications may be made without departing from the invention and it is intended to cover in the appended claims all such modifications and equivalents as fall within the true spirit and scope of this invention.

What is claimed is:

1. A fluid seal for a movable member extending through an opening of a pressurized fluid chamber comprising first and second porous metal matrices located perimetrically around the member, and a high viscosity sealing material filling at least a portion of said second porous matrix, the fluid chamber opening of a size to provide a radial gap between the confronting opening and member surfaces, said gap permitting passage of the pressurized fluid from the chamber to the first porous matrix, said first porous matrix distributing the pressurized fluid to at least one surface of the second porous matrix for forcing the sealant material therethrough into sealing contact with the confronting portion of the member.

2. A fluid seal for a movable member extending through an opening of a pressurized fluid chamber, comprising a first calathiform porous metal matrix, a second porous metal matrix, a high viscosity sealant material filling at least a portion of said second porous matrix, the second matrix seated within the first matrix, both first and second matrices located perimetrically around said member, and means providing passage of the pressurized fluid from the chamber to the first matrix, said first matrix distributing the pressurized fluid to two surfaces of the second matrix for forcing the sealant material therethrough into sealing contact with the confronting portion of the member.

References Cited in the file of this patent

UNITED STATES PATENTS

| | | | |
|---|---|---|---|
| 2,129,844 | Kiefer | _____ | Sept. 13, 1938 |
| 2,442,202 | Hughes-Caley | _____ | May 25, 1948 |
| 2,473,139 | Dickerman | _____ | June 14, 1949 |